March 7, 1939.     E. E. LEMIRE     2,149,922
BOOK PAGE PROTECTOR
Filed May 31, 1938

Elias E. Lemire
INVENTOR

BY Victor J. Evans & Co.
ATTORNEYS

WITNESS J P Marky

Patented Mar. 7, 1939

2,149,922

UNITED STATES PATENT OFFICE 2,149,922

BOOK PAGE PROTECTOR

Elias E. Lemire, Cloquet, Minn.

Application May 31, 1938, Serial No. 211,052

3 Claims. (Cl. 2—21)

My invention relates to the handling of books and includes among its objects and advantages the provision of an improved page protector.

In handling books for reading purposes, pages become damaged through wear and soiling due to contact with the hands, as when holding the book in an open position. Frequently, the hands are moist as well as soiled, and the wear caused by thumb contact as well as soiling frequently causes considerable damage. This is particularly true in connection with books that are read frequently, especially in books having thin pages. In many cases, the printing is soiled to such a degree as to render it invisible for reading purposes. In valuable and high-priced books, irreparable damage, such as, discoloration and wear, is frequent.

An object of my invention is to provide page protecting means which may be attached to the thumbs of the reader in which the protectors slide smoothly and freely on the pages and in which the protectors embody transparency so as to render the printing readable even though the protectors should extend partly over the printed matter.

Another object is to provide book page protectors which may be attached to the thumbs of the reader and in which the protectors are so devised as to permit the reader to handle the book in the usual manner and to turn pages without interference from the protectors.

Figure 1:
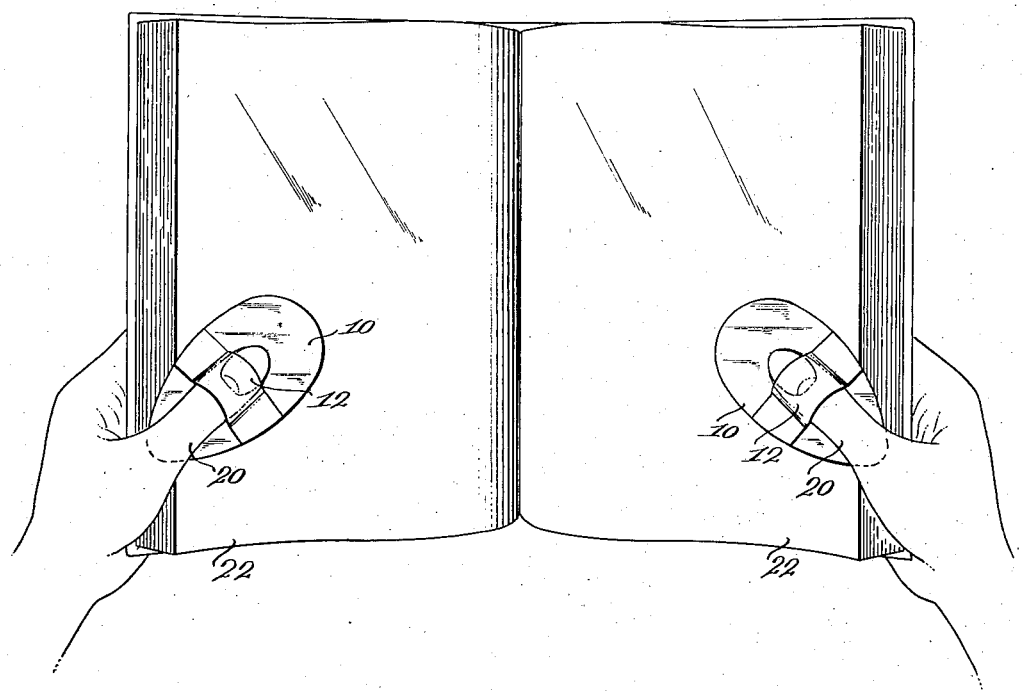
Fig. 1 is a perspective view of an open book showing the manner in which my page protectors are attached to the thumbs of the reader and related to the book.
Figure 2:
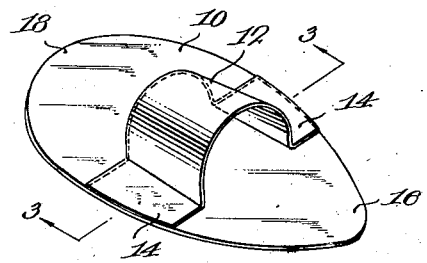
Fig. 2 is a perspective view of one of the protectors.
Figure 3:
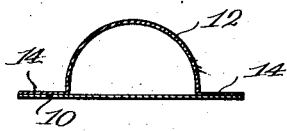
Fig. 3 is a sectional view along the line 3—3 of Fig. 2.

In the embodiment selected to illustrate my invention, I make use of an oval-shaped pad 10 which preferably comprises slightly rigid material, such as Cellophane, of transparent properties. Both protectors are identical in construction. According to Figs. 2 and 3, a thumb cap or loop 12 is bent to provide flanges 14 which are cemented to the pad. The thumb cap or loop 12 is located substantially intermediate the ends 16 and 18 of the pad 10 and taper slightly in the direction of the end 18.

While pad 10 comprises clear and transparent material, the thumb cap or loop 12 comprises Cellophane of a contrasting color to lend visibility thereto since the pad alone is quite invisible when lying on a table or other object. In operation, the thumbs 20 are inserted in the thumb caps or loops 12. The thumb caps or loops have their longitudinal axes directly over the major axes of the oval-shaped pads 10. Because of their tapered configuration, the pads are effectively retained on the thumbs.

The areas of the pads 10 are such as to effectively protect the thumbs from contact with the pages 22 of the book. The ends 16 extend sufficiently far underneath the thumbs to give full protection. While the ends 18 may project partly across printed matter on the page therebeneath, their transparent properties lend visibility thereto. The pads slide freely and smoothly along the pages, and the forefingers are free for turning of the pages. The pads are light in weight, and their oval shapes embody the necessary length, but the tapered ends 16 lend clearance to the forefingers for turning pages. The pads protect the pages against wear and soiling and are comfortable in addition to permitting free turning of pages with the protector or protectors attached. Many books are read frequently in some particular part, and in such situations the pads afford complete protection.

Without further elaboration, the foregoing will so fully explain my invention that others may, by applying current knowledge, readily adapt the same for use under various conditions of service.

I claim:

1. A book page protector comprising a transparent pad, and means cooperable with the pad for attaching the latter to a reader's thumb, with the pad lying against the palm side of the thumb, said pad being of considerably larger area than the palm side of the thumb.

2. A book page protector comprising a pad of transparent material, and loop means cooperable with the pad for attaching the pad to a reader's thumb, with the pad lying against the palm side of the thumb, said pad being of considerably larger area than the palm side of the thumb.

3. A book page protector comprising an oval-shaped pad of transparent material, and a loop attached to the pad for the reception of a reader's thumb, with the pad lying against the palm side of the thumb, said loop being tapered in the direction of the wider end of the pad, said pad being of considerably larger area than the palm side of the thumb.

ELIAS E. LEMIRE.